Figure 2A:
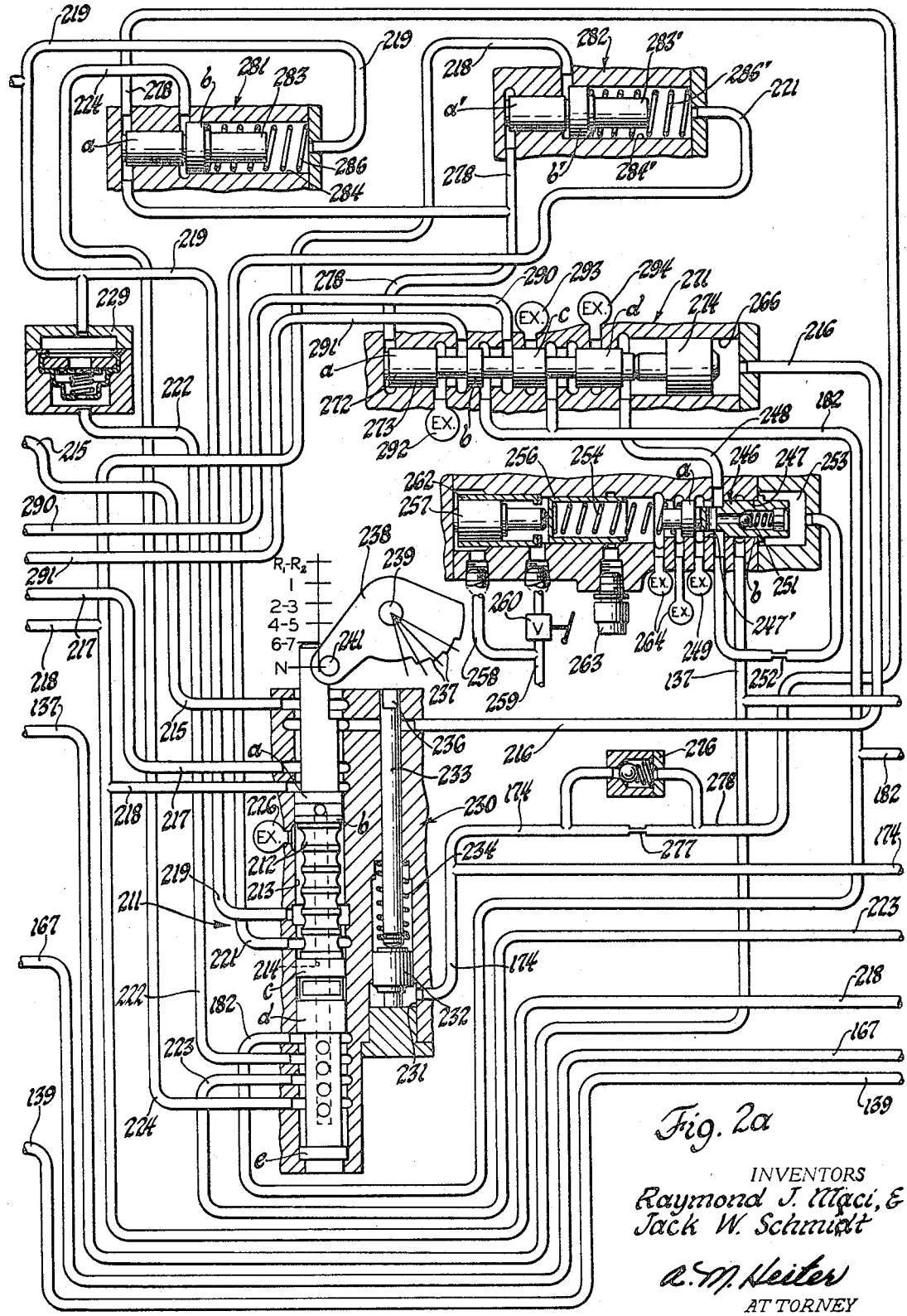
Figure 26:
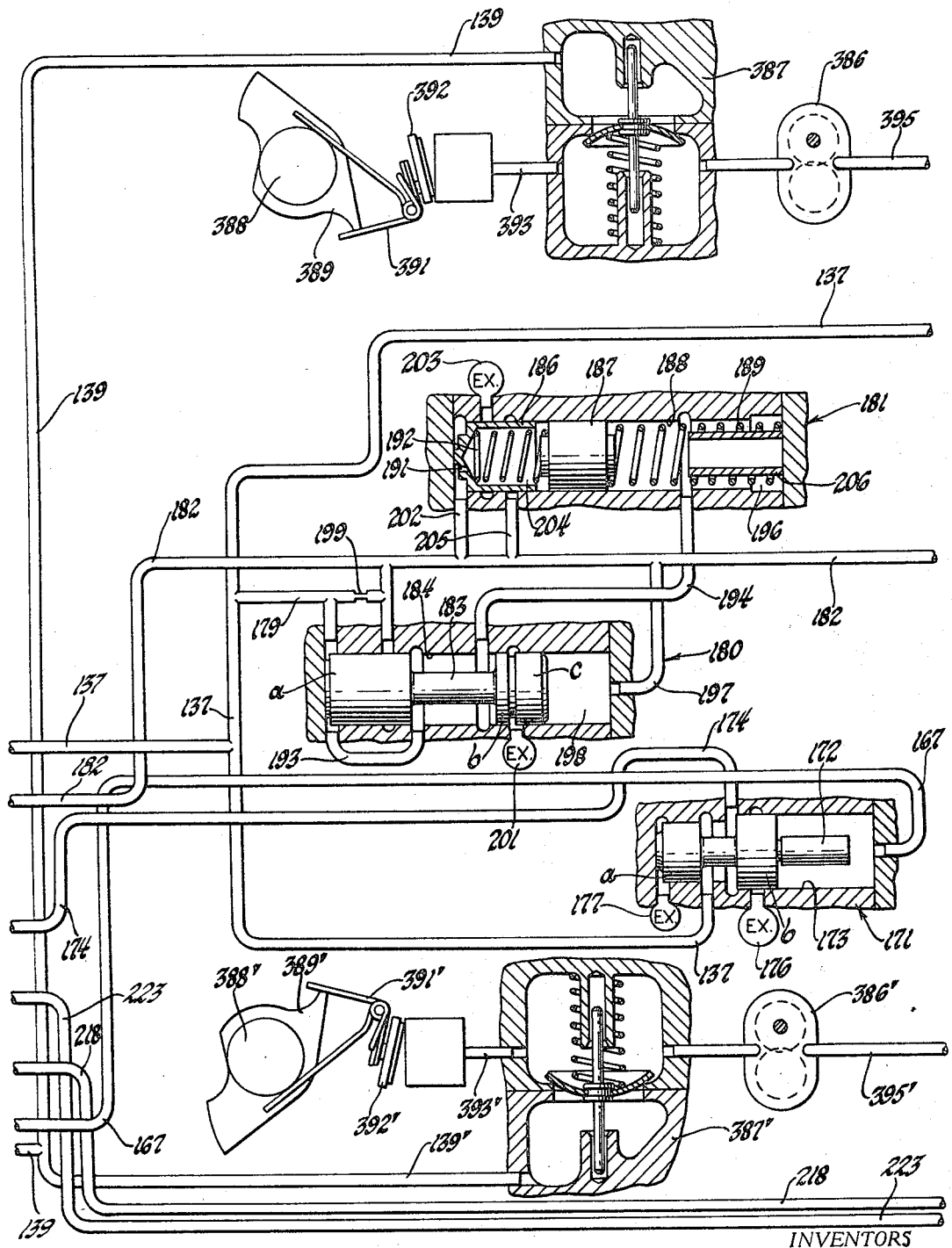

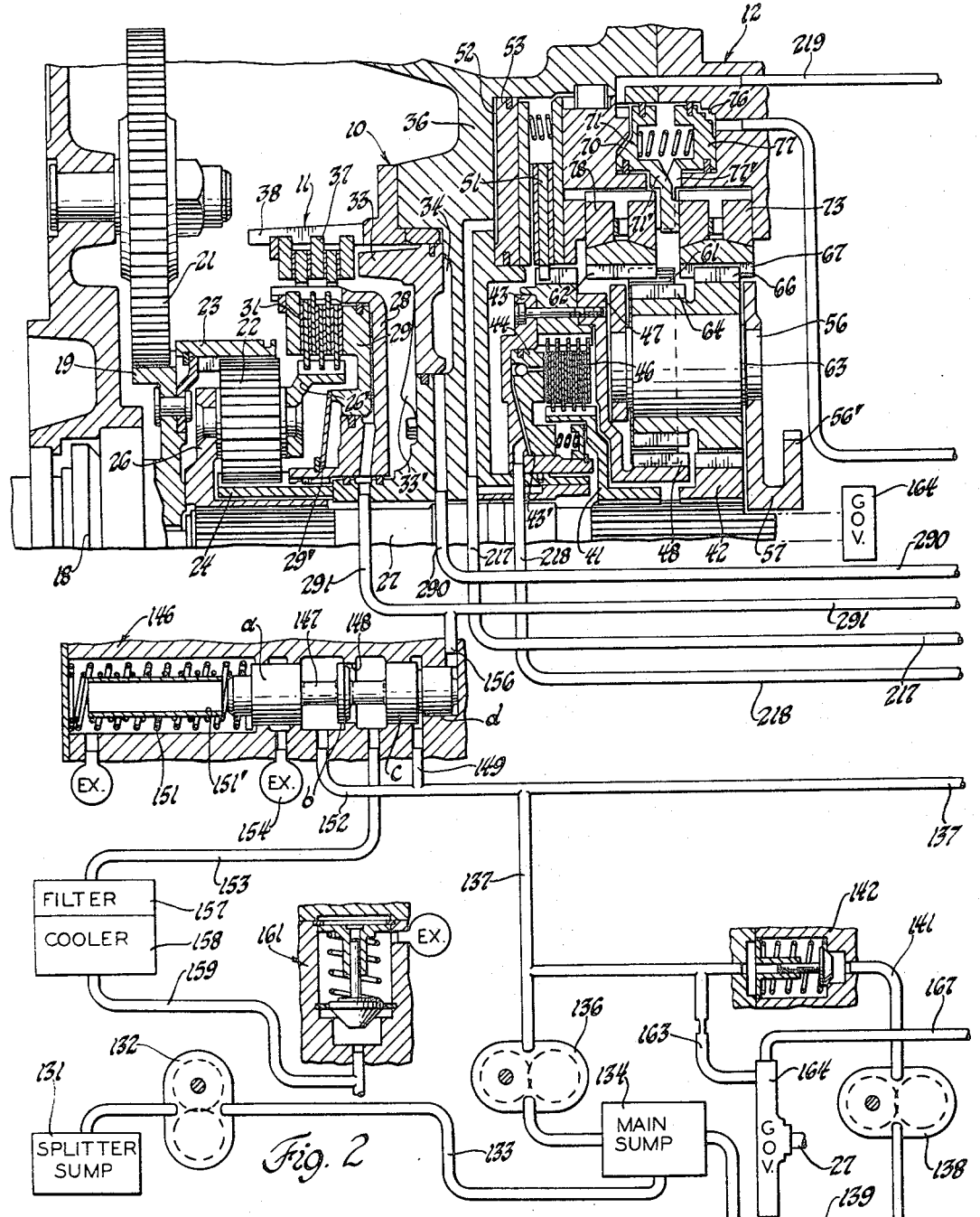

INVENTORS
Raymond J. Maci, &
Jack W. Schmidt

ATTORNEY

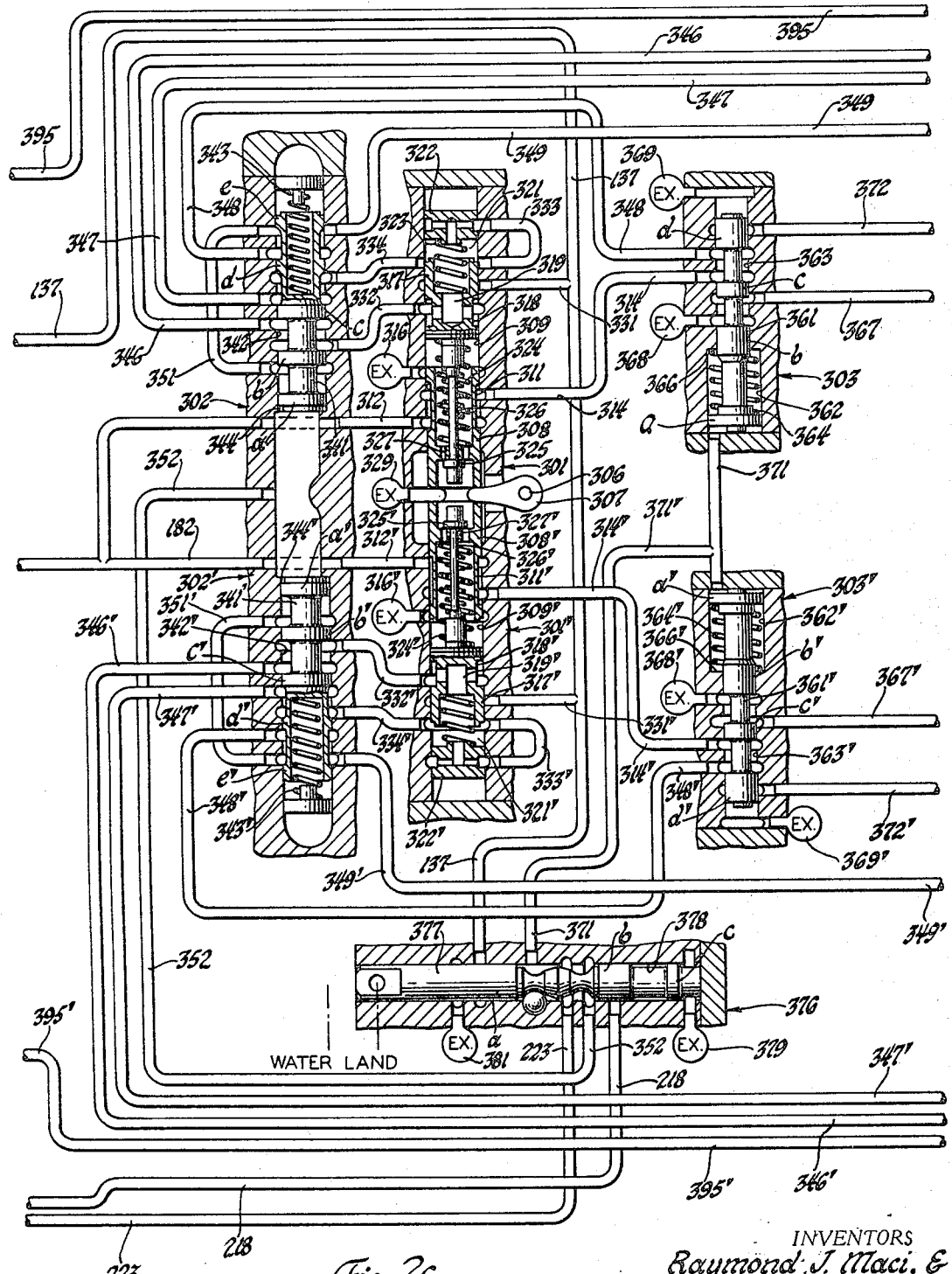

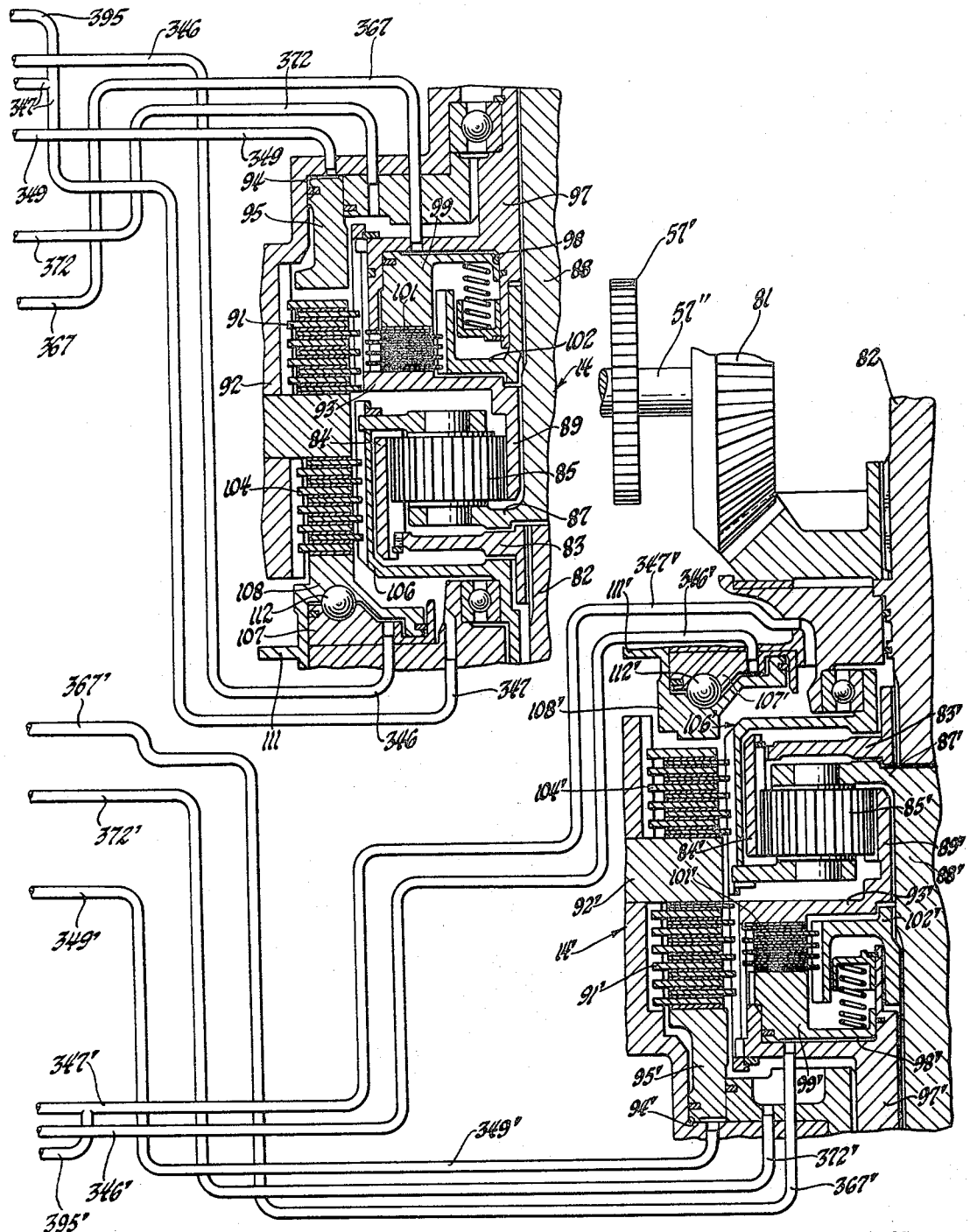

////
United States Patent Office 3,403,583
Patented Oct. 1, 1968

3,403,583
TRANSMISSION
Raymond J. Maci and Jack W. Schmidt, Indianapolis, Ind.,
assignors to General Motors Corporation, Detroit,
Mich., a corporation of Delaware
Filed Nov. 25, 1966, Ser. No. 597,053
20 Claims. (Cl. 74—720.5)

This specification relates to transmissions and more particularly to a control system for ratio change of a multiratio transmission and a control system for ratio change and steering in a multiratio cross drive transmission.

The cross drive transmission has a multiratio transmission unit having a splitter unit and a range unit and a multiple ratio cross drive and brake unit. Ratio controls selectively combine ratios of each unit to provide a plurality of overall ratios. The steering controls put into operation one of two types of steering, drive brake steering or geared steering in the cross drive unit as determined by the joint control of the manual ratio control and a steer type control. The steer type control makes available two different groups of transmission ratios each having a selected steer type program to meet the different tractive effort requirements, for example in land and water operation, to provide the optimum ratios for maximum utilization of engine power and optimum steering for maximum maneuverability.

In one position of the steer type control, the ratio control provides one group of overall ratios by selected combinations of splitter, range and cross drive unit ratios and in another position a different group of overall ratios is provided. Also, in the one group there is one subgroup of ratios having drive brake steering and another subgroup of ratios having geared steering while in the different group of overall ratios the subgroups include different ratios. The controls to provide this operation include manual and automatic ratio control valves, steer valves, relay valves and a steer type selector valve. Signals from the manual ratio selector valve and the manual steer type selector valve control the position of the relay valves to provide a change in the selection of the group of ratios provided by the ratio selector valve and the subgroup of ratios in which drive brake steer and geared steer are available. The steer type selector valve makes available two different groups of overall ratios to meet different tractive effort requirements, a group including lower ratios for operation on firm ground and a group including higher ratios for operation on loose ground or water for maximum utilization of engine power and two different subgroups of steer types, i.e., drive brake and geared, to provide drive brake steer in only the lower ratios for land operation and for all but the highest ratios for water operation for maximum maneuverability.

An object of the invention is to provide in a transmission having two outputs, ratio and steering controls selectively providing one group of ratios and one steer program and another group of ratios and another steer program.

Another object of the invention is to provide in a multiratio cross drive transmission an overall ratio control and a steering control overcontrolled by a steering type control operative in one position to provide one group of overall ratios having drive brake steer in one subgroup of ratio drives and geared steer in the other ratio drives and another group of overall ratios having drive brake steer in a different subgroup of ratio drives and geared steer in the remaining drives.

Another object of the invention is to provide in a multiratio cross drive transmission, an overall ratio control system having a ratio control valve, a steer type control valve, relay valve and steering control valve in which the ratio control valve directly controls some ratio selection and in conjunction with the steer type control valve control of the relay valves to modify the operation of the ratio control and steering control valves to selectively provide two different groups of overall ratios in response to the same ratio control valve positions and in one group the steering valve provides drive brake steer in one subgroup of ratio drives and geared steer in the other ratio drives and in the other group drive brake steer in a different subgroup of ratio drives and geared steer in the remaining drives.

These and other objects of the invention will be more apparent from the following description and drawing of the invention.

FIGURES 2, 2a, 2b, 2c and 2d, when arranged in accordance with FIGURE 1, diagrammatically show the transmission gearing and the control system therefor.

The cross drive transmission gearing includes an axially located multiratio unit 10 having an input splitter unit 11 and a range unit 12, as shown in FIGURE 2, which drives the cross drive unit which consists of right and left two-speed drive unit 14 and 14', FIGURE 2d. The engine drives the input shaft 18 which has fixed thereon a drive gear 19 driving the accessory drive gear 21. The splitter gear set has a plurality of pinions 22 meshing with ring gear 23 driven by gear 19 on the input shaft and with the sun gear 24. The pinions are mounted on a carrier 26 drive connected by splines to the intermediate shaft 27. The control cylinder 28 is drive connected by suitable splines to the sun gear 24 for rotation therewith and is axially fixed. A piston 29 is mounted in the cylinder for movement to engage the direct drive clutch plates 31 which are alternately splined to the cylinder 28 and carrier extension 26' to lock up the gear unit for direct drive. Piston 33 is movable in cylinder 34 in fixed housing 36 and is operable to engage the reaction brake 37 having alternate plates splined to a portion 38 of the fixed housing 36 and the cylinder 28 to be operative on engagement to hold the sun gear 24 for reduction drive. Suitable Belleville reaction springs 29', 33' for pistons 29, 33, are shown.

The intermediate shaft 27 drives the input clutch hub 41 and the rear sun gear 42 of the range gear unit 12. The clutch motor hub 43 is rotatably mounted on the fixed housing and has a cylinder 43' and a piston 44 movably mounted therein to engage the clutch plates 46 which are alternately splined to the input clutch hub 41 and the motor hub 43 which is connected by hub 47 to drive the first sun gear 48 for high or direct drive. The front sun gear 48 is also connected by the hub 47 and motor hub 43 to the reaction brake 51 which is engaged by supplying fluid under pressure to the cylinder 52 in the fixed housing 36 to move the piston 53 to engage brake 51 and thus hold sun gear 48 for intermediate drive. The planetary carrier 56 and shaft 57 are drive connected by gear 56', FIGURE 2, meshing with the gear 57' on shaft 57", FIGURE 2d, or shaft 57 may be directly splined to gear 81 to drive the range unit output shaft 57 and has mounted thereon a single planetary pinion 61 which meshes with the front sun gear 48 and the front ring gear 62 and a dual planetary pinion 63 having a small forward pinion portion 64 meshing with the single planetary pinion 61 and a rear larger pinion portion 66 meshing with the rear sun gear 42 and the rear ring gear 67. The low motor has a cylinder 70 in the fixed housing and a movable piston 71 having apply fingers 71' operative to move the movable cone ring toward the fixed cone ring of the two-cone brake 73 to hold the rear ring gear 67. When fluid is supplied to the cylinder 76 in the fixed housing to move the piston 77 and the apply fingers 77', the movable cone ring is moved to the left to engage the fixed cone ring of the two-cone brake 78 to hold the ring gear 62 for reverse drive. Each cone brake includes oppositely tapered surfaces on the outer diameter of the ring gear and a pair of ring members splined to the housing and having matching cones on the inner surface, one being axially fixed and the other axially movable by the actuating ring toward the one member to engage the cone brake. The motors have retraction springs as shown.

Low, intermediate and direct drive or high forward drives and reverse drive are provided in the range gear set 12, respectively, by supplying fluid to low motor 70–71 to hold the ring gear 67, by supplying fluid to intermediate motor 52–53 to engage brake 51 to hold sun gear 48, by supplying fluid to clutch motor 43–44 to engage clutch 46 to drive sun gear 48 along with sun gear 42 to lock up the gear unit for direct drive and by supplying fluid to motor 76–77 to hold ring gear 62 to provide reverse drive. Each of the above drives is used with splitter low and high to provide six forward ratio drives and two reverse drives.

Ratio unit output shaft 57 through the bevel gear set 81, FIGURE 2d, drives the cross input shaft 82, which drives the right and left cross drive transmission units 14–14′. In the right drive unit 14 the cross shaft 82 through a hub 83 drives the ring gear 84. The planetary gear set has pinions 85 mounted on carrier 87 drive connected to right output shaft 88 and meshing with input ring gear 84 and control sun gear 89. The control hub 93 rotates with sun gear 89 and is braked by brake 91 between the hub and housing 92 when actuated by the motor provided by cylinder 94 and piston 95. The hub 93 has a portion 97 rotatably mounted in housing 92. The portion 97 has a cylinder 98 therein for the piston 99. On the supply of fluid to the cylinder, the piston engages the clutch 101 to connect the hub 93 with the output hub 102 fixed to the output shaft to cause the sun gear to rotate with the output shaft and to lock up the gear unit for high or one to one drive. The vehicle brake 104 has plates splined to the housing 92 and a drum 106 which rotates with the carrier 87 and the output shaft 88. When fluid is supplied to the cylinder 107 to move the piston 108, the brake is engaged. The brake 104 is also manually actuated by a suitable linkage having a lever 111 fixed to piston 108 to rotate the annular piston so the ball and cam mechanism 112 applies the brake. The brakes and clutches have retraction springs.

The left cross drive unit 14′ is also driven by the cross shaft 82 and has the same structure in mirror image arrangement and the above description applies to the same reference numerals primed.

*Fluid control system*

The lower sump 131 of the splitter unit of the transmission is scavenged by scavenge pump 132 which delivers fluid via line 133 to the main sump 134 of the cross drive unit. The input driven pump 136 driven by accessory gear 21 supplies fluid from sump 134 to the main line 137. The output pump 138 supplies fluid via lines 139 from the sump 134 to the pump outlet line 141 which is connected through check valve 142 to supply the main line 137 but prevents reverse flow.

The main line is regulated by the regulator valve 146 which has a valve element 147 having large lands $a$, $b$ and $c$, and a smaller land $d$ located in a stepped bore 148. The main line branch 149 is connected between lands $c$ and $d$ to act on the differential area of land $c$ to move the valve element against the dual biasing spring 151 located in the exhausted end of the bore. The stop sleeve 151′ is in friction contact with the inner spring to damp the spring and support the stop sleeve. The main line branch 152 is connected between the lands $a$ and $b$ and initially is connected to overage line 153 and if this is insufficient to exhaust 154 to regulate the pressure in main line 137. Splitter high pressure is connected by branch 156 to act on land $d$ to decrease main line pressure in splitter high ratio. The overage line 153 is connected through filter 157 and cooler 158 to a lube line 159 connected to lubricate the transmission at a pressure controlled by relief valve 161. The main line is also connected by a restrictive branch 163 to a paddle wheel governor as shown in Schaefer patent application S.N. 438,634, filed Mar. 10, 1965, or a pitot governor 164, as shown in Christenson Patent No. 3,255,642, driven by the splitter output shaft 27 and thus supplying to the governor line 167 a pressure proportional to splitter output speed. Governor line 167, FIG. 2b, is connected to an amplifier valve 171 having a valve element 172 having stepped lands $a$ and $b$ located in stepped bore 173. The governor pressure in line 167 acts on the area of larger land $b$ and is opposed by fluid supplied from main line 137 regulated at the amplified governor pressure in 174 acting on the differential area between small land $a$ and large land $b$. The exhaust 176 prevents excessive pressure build-up in 174 required to balance governor line 167 and exhaust 177 prevents any pressure acting on the end of land $a$.

The main line 137 is connected by branch 179, restricted passage 199, the flow valve 180 and trimmer valve 181 to the trimmed main line 182 to reduce the trimmed main line pressure to a low value at the initiation of each ratio change and gradually increase the pressure to complete each ratio change in the multiratio transmission unit and the cross drive transmission unit. However, as noted below the pressure to establish ratio and drive changes to change from straight drive to a turning drive are controlled by the steer valves. The flow valve 183 having lands $a$ and $b$ of equal diameter and a larger land $c$ is located in a stepped bore 184. The trimmer valve has a regulator plug 186 and a control plug 187 located in a bore 188 which are biased in a closed position by a spring 189. The restricted passage 191 passes axially through the regulator plug 186 and the spring 192 biases the regulator plug and the control plug apart.

In the absence of flow, these valves are in the position shown with the main line connected by branch 179 to act on the end of land $a$ of flow valve 183 and connected by line 193 between the lands $a$ and $b$ to the reset line 194 to the closed chamber 196 to act on the control plug 187 to hold the trimmer valve 181 in the closed position, so that the pressure in the trimmed main line 182 is the same as main line 137. Restricted passage 199 provides make-up fluid with a pressure drop. The trimmed main line pressure 182 is connected by branch 197 to chamber 198 acting on the larger land $c$ of the flow valve to hold the valve in the open position, shown. When higher fluid flow is required to engage a ratio motor there is flow from main line branch 179 through restricted passage 199 to the trimmed main line 182 which creates a pressure drop reducing the pressure in the trimmed main line and chamber 198 causing the main line pressure to act on the end of land $a$ to move the flow valve to the right blocking the connection of main line branch 193 to reset line 194 and connecting reset line to exhaust 201 to condition the trimmer valve 181 for a trim cycle. The pressure in line 182 connected via branch 202 acts on the end of regulator plug 186 against the low bias of extended spring 189 and regulates the pressure in trimmed line 182 at a low value by exhausting excess fluid through exhaust 203. At the same time fluid flows through restricted passage 191 to fill the space 204 and the spring 192 separates the regulator plug and control plug gradually to increase the effective valve length and pressure. Since leakage flow from space 204 to exhaust 203 will reduce or, if greater than flow through restriction 191, will limit the rate and value of the pressure rise, branch 205 and its annular port is pressurized to block this leakage flow. When the control plug 187 hits stop 206, trimmed pressure in line 182 is the same as main line pressure and acts via branch 197 on the larger land $c$ to return the flow valve 180 to the position shown connecting main line pressure via branches 179, 193 and reset line 194 to reset the trimmer valve 181 to the position shown.

The manual control valve 211 (FIGURE 2a) connects the trimmed main line 182 to the ratio and signal lines and has a valve element 212 manually moved in bore 213. The trimmed main line 182 is connected at all valve positions by the space between the lands $d$ and $e$ via bore 214 closed at both ends to the space between the lands $c$ and $d$ and the space between the lands $a$ and $b$ to selectively feed reverse clutch line 215, first signal line 216, intermediate clutch line 217, high clutch line 218, low clutch line 219, intermediate low signal line 221, low exhaust line 222, steer signal line 223 and high intermediate signal line 224 in each of the valve positions, neutral, 6th–7th ratio, 4th–5th ratio, 2nd–3rd ratio, 1st ratio and reverse ratio as shown by the X's in the following table and to exhaust the other lines at either end of the valve body or central exhaust 226.

lands $a$, $b$, $c$ and $d$ located in a bore 273 and a control plug 274 located in an enlarged closed bore portion 266. The amplified governor line 174 is connected in parallel through a one-way check valve 276 to permit supply to the splitter governor line 278 and a restricted passage 277 to permit freer flow to the splitter governor line 278 and more restricted flow from the splitter governor line. The splitter governor line is also connected to the low accumulator 281 and the high accumulator 282. Low accumulator 281 has a piston 283 having land $a$ and larger land $b$ located in a stepped bore 284 and is biased to discharged position by spring 286. The similar high accumulator 282 has a piston 283' with lands $a'$ and $b'$ in stepped bore 284' and is biased to discharged position by spring 286'. Splitter governor pressure is connected to the small end of bores 284, 284', respectively, of valves 281, 282 and is controlled by movement of the accumulators between charged and discharged (shown) positions. The high intermediate signal pressure line 224 is con-

| Man. v Pos. | Rev. Cl. 215 | 1st Sig. 216 | Int. Cl. 217 | Hi Cl. 218 | Lo Cl. 219 | Int-Lo Sig. 221 | Lo Ex. 222 | Steer Sig. 223 | Hi-Int. Sig. 224 | Acc. Lo 281 | Acc. Hi 282 |
|---|---|---|---|---|---|---|---|---|---|---|---|
| N | | | | | | | X | X | X | C | D |
| 6–7 | | | | X | | | X | X | X | C | *C |
| 4–5 | | | X | | | X | X | X | X | C | *D |
| 2–3 | | | X | | X | | X | | | *D | D |
| 1 | | X | | | X | | | | | D | D |
| R₁–R₂ | X | | | | | X | | | | D | D |

Low exhaust line 222 is connected by check valve 229 to low clutch line 219 preventing flow fluid under pressure from low exhaust line to the low clutch line and permitting flow from the low clutch line to the low exhaust line when the low exhaust line is exhausted. A convention ball detent engages the grooves in the center portion of valve element 212 to resiliently hold the valve element in each of the above positions.

In the downshift inhibitor 230, the amplified governor pressure line 174 is connected to the closed end of bore 231 to act on the valve element 232 which, with increasing governor pressure, moves the follower rod 233 upwardly against the bias of spring 234 so that the rod end 236 engages the steps 237 of cam 238 which is pivoted to the valve housing by pin 239 and connected by pin 241 to move with the valve element 212. The governor pressure positions the rod end 236 with respect to step 237 to prevent a manual downshift of the shift valve at speeds sufficiently high to permit dangerous overspeed operation of the transmission gearing.

The torque demand control valve 246 has a regulator valve element 247 having lands $a$ and $b$ located in a uniform bore 247'. Main line pressure supplied from main line 137 is regulated and supplied to the torque demand signal line 248 and excess pressure vented to exhaust 249. The torque demand pressure in line 248 is connected by one-way check valve 251 and restricted by-pass 252 to the chamber 253 where it acts on the end of valve element 246 to urge the valve element against the biasing spring 254 which is seated in the movable abutment cylinder 256. A plug 257 having a smaller diameter than cylinder 256 is located in the small closed end bore portion 262. Gasifier pressure from the gas turbine compresses discharge, as shown in Spreitzer et al. Patent No. 3,093,010, is supplied via line 258 to the bore behind plug 257 to bias the plug to move the abutment cylinder to vary the spring bias and thus torque demand pressure in line 248 in accordance with gasifier pressure. The gasifier pressure line 258 is also connected via branch line 259 controlled by manual throttle actuated on-off valve 260 to act directly on abutment cylinder 256 to increase the torque demand pressure at all gasifier pressures for a forced downshift at a high or full throttle position. Atmospheric vent 263 permits escape of gasifier gas without frothing the oil. Exhausts 264 vent leakage oil from the bore.

Splitter shift valve 271 has a valve element 272 having nected at the step of the bore to act on the differential area of land $b$ of accumulator 281 to quickly move the valve element to the charged position providing a momentary reduction in the splitter governor pressure. High clutch pressure line 218 is similarly connected to valve 282 to act on the differential area of land $b'$ to put the accumulator in charged position. The accumulator 281 is quickly moved to a discharged position by low clutch pressure 219 which is connected to the closed spring chamber to act on land $b$ of accumulator 281. Accumulator 282 is similarly moved by intermediate low signal pressure line 221 which is connected to closed spring chamber and acts on land $b'$ of valve 282. The above chart in the columns accumulator (ACC. 281 and 282) indicate when the accumulators are charged (C) and discharged (D) and the asterisk indicates the changes.

With the splitter shift valve element 272 in the downshift position, trimmed pressure line 182 is connected between lands $b$ and $c$ to the splitter low line 290 to actuate the splitter low motor 33–34 and the splitter high motor 28–29 is connected by line 291 to exhaust 292 for disengagement. When the manual valve is in the first ratio position fluid pressure supplied to the first signal line 216 acts on the free end of control plug 274 to hold the valve in the position shown and there are no upshifts. In other positions of this valve line 216 is exhausted and the valve is free to move under the joint action of the torque demand pressure in line 248 acting on the free end of land $d$ and the splitter governor pressure line 278 acting on the free end of land $a$ which under proper speed and torque demand conditions will upshift the valve 271 to connect trimmed line 182 to the splitter high line 291 and connect splitter low line 290 to exhaust 293. Land $b$ is larger than land $c$ and land $c$ is larger than land $d$ so in the downshift position shown there are two hysteresis forces holding the valve 272 in the downshift position which are vented to, respectively, exhausts 293 and 294 so a downshift occurs at a lower governor pressure and speed. The hysteresis force between lands $c$ and $d$ is unaffected by flow to a motor and thus is effective immediately. Lands $a$ and $b$ are the same diameter so no hysteresis force is provided in the upshift position.

With the manual valve in first ratio position, splitter shift valve 271 is locked in low position by first signal pressure 216, accumulator valve 281 is held in the discharged position by the spring and low pressure 219 and accumulator valve 282 is biased by the spring to the discharged position. On a manual shift to the 2nd–3rd ratio position, first signal line 216 is exhausted permitting free operation of the shift valve and the accumulators 281, 282 remain discharged. Intermediate low signal pressure 221 is adapted to accumulator 282 so both accumulators are positively discharged by control fluid. This manual valve change merely upshifts the cross drive unit in land operation and does not change ratio in water operation as described below and thus conditions the splitter shift valve for normal speed and torque demand shifting. On a 2–3 ratio position to 4–5 ratio position of the manual shift valve, low clutch line 219 is exhausted and high intermediate signal line 224 is supplied so that accumulator 281 is moved to the charged position momentarily reducing splitter governor pressure in line 278 and downshifting the splitter shift valve to insure a 3–4 shift as opposed to a 3–5 shift. Intermediate low signal pressure, being present in both 2–3 and 4–5 positions of the manual valve, holds the accumulator valve 282 in discharged position in both manual positions. On a 4–5 ratio to 6–7 ratio manual ratio valve shift, the intermediate low signal line 221 is vented and the high clutch line 218 moves accumulator 282 to the charged position lowering pressure in splitter governor line 278 to insure a 5–6 shift. The high intermediate signal pressure line 224 is pressurized and low clutch line 219 is exhausted in both the 4–5 and 6–7 positions, thus accumulator 281 remains in the charged position. On a downshift from the 6–7 to the 4–5 ratio position of the manual valve, high clutch line 218 is vented and intermediate low signal line 221 supplied to quickly discharge the accumulator 282 to momentarily increase the splitter governor pressure to insure a 6–5 rather than a 6–4 downshift. The high intermediate signal remains supplied holding the accumulator 281 in the charged position, but on a shift to the 2–3 position, this line is vented and the low clutch line 219 acts to discharge the accumulator to provide a 4–3 downshift. Thus, the movement of each accumulator, as described above and indicated by the asterisk in the above table, is positive under a signal or control pressure at the main line pressure value to instantly provide a uniform governor pressure increase or decrease. The swept volume of the governor pressure chamber of each accumulator is substantially larger than the swept volume of the governor chamber of the splitter shift valve. The governor line 278, fed by check valve 276 and restriction passage 277, provides a sufficient volume of flow for normal operation of the shift valve without reduction of governor pressure but a partially restricted flow so that the governor pressure is momentarily substantially reduced during the charging of an accumulator to downshift the splitter shift valve during range upshifts. The accumulators discharge governor fluid on range downshifts and, due to the more restricted or smaller restricted passage 277, governor pressure increases to upshift the splitter shift valve. On the 1 to 1–2 shift, there is no range shift and the accumulators do not function. Also, on a shift to reverse the accumulators do not function. On a neutral to 6–7 shift, accumulator 282 is charged to provide a shift to 6th.

*Steer system*

The steering system has a right manual steer valve 301 and a left manual steer valve 301', a right first relay valve 302 and a left first relay valve 302', a right second relay valve 303 and a left second relay valve 303'. A manually operated shaft 306 moves the steer valve cam 307 either to the right or left to operate the right or left manual steer valve respectively. Since the right and left steering systems are the same, the following description of the right steering system will apply with reference to the same numbers primed to the left steering system. The cam 307 directly engages the control valve element 308, which is slidably mounted in the bore 309. The control element 308 has a groove 311 to connect the trimmed main line branch 312 to the right output clutch feed line 314 in the straight drive position shown. When the cam 307 is moved to depress the right control valve 308 for right turning, the supply from line 312 is cut off and the right output clutch feed line 314 is connected to exhaust 316. The regulator valve 317 in bore 309 has an annular groove 318 which is connected by a central passage 319 to the pressure regulator chamber 321 at the free end of the regulator valve. A fixed abutment 322 seals the end of the bore. A spring 323 seated on the fixed abutment 322 biases the regulator valve 317 to the straight drive or closed position shown. Regulator valve 317 has a stem 326 passing through shoulder 327 within hollow control valve element 308 and a head 325 at the end of the stem. A spring 324 between the regulator valve 317 and the control valve 308 biases the valves apart from each other until the stop head 325 on stem 326 engages shoulder 327 to limit the separating movement of the two valves. Shoulder 327 is apertured to permit exhaust to the central exhaust port 329.

As the right steer valve 308 is moved, the feed of the trimmed main line via branch 312 to the right output feed line 314 is cut off and line 314 is connected to exhaust 316. Movement of the stem valve 308 also frees head 325 and regulator valve 317 and compresses spring 324 to move valve 317 so the main line via branch 331 is connected by groove 318 to the right steer feed line 332 and via passage 319 to chamber 321 to apply a biasing force balancing the force of spring 324 so the regulated pressure of the steer feed line 332 is proportioned to the degree of movement of steer valve 308. This regulated pressure in chamber 321 flows through restrictive passage 333 to the coolant feed line 334. To exhaust the regulating chamber 321, the regulating valve 317 in the straight drive position shown directly connects this chamber to the coolant feed line 334. This direct connection is closed when the valve is in the regulating position.

The right first relay valve 302 has a valve element 341 having lands *a, b, c, d* and *e* located in a uniform bore 342 and is biased by springs 343 to the central position shown against a shoulder 344. In the central position shown, the right steer feed line 332 is connected between lands *b* and *c* to the right brake apply line 346, the coolant feed line 334 is connected between lands *c* and *d* to the brake coolant line 347 and the relay feed line 348 is interconnected between lands *d* and *e* to the right gear steer apply line 349. When the first relay signal line 352 supplies fluid to the bore 342 between the right and left first relay valve 302 and 302' the valves are moved apart to an outer position in which the steer feed line 332 is connected between lands *a* and *b* to branch line 351 which is connected between lands *d* and *e* to the right geared steer apply line 349 and the coolant feed line 334 is connected between the lands *c* and *d* to the right relay feed line 348. The rear brake apply line 346 is exhausted to the brake coolant line 347. The left first relay valve 302' is the same with primed numbers.

The right and left second relay valve 303 and 303' are the same. The following description of the right relay valve applies to the left valve with the numbers primed. The right relay valve 303 has a valve element 361 having a large land *a* located in a large bore portion 362 and lands *b, c* and *d* of equal and smaller size located in a smaller bore portion 363. A spring 364 seats on the shoulder 366 between the stepped bores and the land *a* to urge the valve to the central position in which the right output feed line 314 and the right relay feed line 348 are connected and the right output clutch line 367 is connected to exhaust 368. The end of bore 363 beyond land *d* is vented by exhaust 369 to permit free movement of the valves when the control fluid is supplied by the second relay signal line 371 to the closed end of bore 362 to act on land *a* to move both relay valves to the outer position in which the right output feed line 314 is connected to the right output clutch line 367 and the right relay feed line 348 is connected to the right geared steer coolant line 372.

The steer selector valve 376 has a valve element 377 having lands a, b and c slidably mounted for movement in the bore 378 from the land position shown to the water position. In the land position, the steer signal line 223 is connected to the second relay signal line 371 and to the first relay signal line 352. High clutch line 218 is blocked. Exhaust 379 vents the closed end of the valve bore and exhaust 381 prevents leakage out of the valve stem at the control end. When the valve 377 is moved to the water position, main line 137 is connected to the second relay signal line 371 and high clutch line 218 is connected to the first relay signal line 352.

The auxiliary right output driven brake coolant pump is unloaded when the right hand brake is manually released and effective for pumping when the right hand brake is applied. The pump is normally ineffective since the shaft 388 of the manual brake apply mechanism has a cam 389 which engages an arm 391 to open air valve 392 to permit entrance of air via line 393 to the pump 386 so that it does not pump fluid. When the brake apply shaft 388 is rotated to apply the brakes by means of a linkage to rotate lever 111, FIG. 2d, the valve 392 is closed and the pump suction opens check valve 387 and draws fluid from the sump via line 139 and supplies it via line 395 to the brake coolant line 347. The left brake coolant pump and system is the same with primed numbers.

Operation

With the manual range selector valve 211 in R and 1st positions there is no steer signal pressure for transmission by the manual steer selector valve 376 in the land position to the relay valves so the springs hold the first relay valves 302 and 302' and the second relay valves 303 and 303' in the central position shown. When the manual range valve 211 is in first position the first signal 216 holds splitter shift valve 271 in low so only 1st ratio is available. In R position splitter shifting provides $R_1$ and $R_2$ ratios. The cross drive units will be in low or geared steer drive with reaction brakes 91, 91' engaged and drive brake steering is available. In the right unit during straight drive, the feed is from the trimmed main line 182 via branch 312 and through the steer control valve 308 to the right output feed line 314 which, at the second relay valve 303, is connected to the relay feed line 348 which is connected between the lands d and e of the first relay valve 302 to the right geared steer apply line 349 to actuate motor 94-95 to apply geared steer reaction brake 91 to establish low ratio or geared drive. The right output clutch is disengaged since motor 98-99 is exhausted via output clutch line 367 to exhaust 368 at the second relay valve 303. Since in straight forward drive the left reaction brake 91' is applied in the same manner, 1st ratio forward and 1st and 2nd ratio reverse are combined with low ratio in the cross drive unit for 1st forward and 1st and 2nd reverse. When the right steer valve assembly is moved by steer cam 307, valve 308 cuts off this flow to the motor 94-95 for reaction or geared steer brake 91 and connects it to exhaust 316 and moves the regulator valve 317 to connect main line branch 331 to provide regulated steer feed pressure in line 332. Steer feed pressure is connected between lands b and c of the first relay valve 302 to the right brake apply line 346 which operates motor 107-108 to engage right brake 104 to brake the output shaft for drive brake steering provided by the disengagement of the low drive and operation of the vehicle brake to provide steering by retarding one drive while the other vehicle drive remains the same.

When the manual valve 211 is in either the 2nd–3rd, 4th–5th or 6th–7th or neutral positions permitting 2nd–7th ratio forward in the overall transmission or 1st–6th ratios in the range unit, it connects trimmed main line 182 via the steer signal line 223 and the steer selector valve 376 to the first relay signal line 352 and the second relay signal line 371 to move the first relay valve 302 and the second relay valve 303 to the outer position. With the relay valves in the outer position, the trimmed main line 182 is connected by branch 312 through the steer control valve 308 to the right output feed line 314 which is connected by the second relay valve 303 to the right output clutch line 367 to actuate motor 98-99 to engage the direct drive clutch 101. Low brake motor 94-95 is exhausted via geared steer apply line 349 to first relay valve 302 and branch 351 to steer feed line 332 which is connected by regulator valve 317 to coolant feed line 334. This line is connected by first relay valve 302 to relay feed line 348 which exhausts to geared steer coolant line 372 at the second relay valve 303. When the steer valve 301 is actuated for a right steer, the above feed to motor 98-99 is blocked by valve 308 and connected to exhaust 316 and main line pressure is regulated by regulator valve 317 and fed to the steer feed 332 and the coolant feed line 334. With the first relay valve 302 in the outer position the steer feed line 332 is connected to branch 351 and to the right geared steer apply line 349 which actuates the motor 94-95 to engage the geared steer reaction brake 91. Thus during steering, the direct drive clutch or output clutch 101 is disengaged and the geared steer or low ratio drive is engaged to provide geared steering in all of these ratios. Coolant feed line 334 is connected by first relay valve 302 to relay feed line 348 and by second relay valve 303 to geared steer coolant line 372.

When the steer selector valve 376 is in the water position the main line 137 is connected via the second relay signal line 371 to move second relay valve 303 to the outer position to provide drive by the output clutch and steering by brake apply in the reverse ratios, neutral, 1st, 2nd, 3rd and 4th–5th positions of the manual valve 211. For straight drive the trimmed main line 182 is connected via branch 312 and the steer control valve 308 to the right output feed line 314. This line is connected by the second relay valve 303 to the right output clutch line 367 to apply the right output clutch for direct drive of the cross drive unit. Thus the 1st overall ratio available in land operation is not available and only 2nd to 7th and $R_1$ and $R_2$ ratios are available for water operation. When the right steer valve 301 moves for steering, this clutch is exhausted at the steer valve 301 to exhaust 316 and the steer regulator valve 317 supplies regulated pressure to the steer feed line 332 which, with first relay valve 302 in the center position, is connected to the right brake apply line 346 to apply the right brake 104. When the brake is applied the coolant feed line 334 is connected by the first relay valve 302 to the brake coolant line 347 which supplies coolant to this brake.

When the manual valve is placed in 6–7 ratio position, the high clutch line 218 is provided with pressure which is connected to the first relay signal line 352 to also place the first relay valves in the outer position. Then the trimmed main line 182 is connected by the steer control valve 301 and the right relay valve 303 to apply the right output clutch 101 in the same way as in land operation. When the steer valve is moved to supply the steer feed line 332, it is connected to the right geared steer line 351 and 349 to apply the geared steer clutch 91 to provide geared steering as in 6th–7th ratio land operation. The coolant line 334 is connected by the first relay valve to relay feed line 348 and this line by the second relay valve to the right geared steer coolant line 372 to supply coolant to the geared steer brake 91 as in land operation.

Left driving and steering operation is the same when applied to the left steer valve 301' and relay valves 302', 303' and the same numbers primed on the left portion of the system.

Thus when the steer type selector valve is in the land position and the manual range selector valve is in 1st, N, $R_1$ and $R_2$, the first and second relay valves are centered and the cross drive units provide the low or a reduction drive for straight forward drive and on drive brake steering. In neutral, the range transmission provides a positive neutral but the cross drive unit functions the same. When the manual range selector valve is in either the 2-3, 4-5 or 6-7 ratio positions, both relay valves are in the outer position and the cross drive unit is in the high or 1:1 ratio position for straight drive. Operation of the steering valve will disconnect this drive and engage the low ratio geared steer drive for geared steering. The water position of this steer type selector valve is for driving the vehicle by the paddle action of the tracks. The maximum tractive effort that may be transmitted by this type driving means is at higher track speeds. Thus in the water position, the lowest ratios are not used. When the steer type valve is in water position and the manual valve is in reverse, first, 2-3, 4-5 and neutral positions, the first relay valves are in the center position and the second relay valves are in the outer position to provide high drive in the cross drive for straight drive. Operation of the steering valve provides drive brake steering by disengagement of the high drive and engagement of the brake on that output. When the manual valve is moved to the 6-7 position, both relay valves are in the outer position and the cross drive is placed in the high drive ratio and operation of the steering valves disengages the high drive and engages the low drive for geared steer. Thus, two ranges of operation are provided. One, used on hard ground where the vehicle driving means can transmit a high tractive effort without slip, several overall forward ratios are provided.

The splitter, range and cross drive units are in low for overall first ratio and drive brake steering. In the higher drive ratios, geared steering is provided which produces a limited turning radius. On very soft terrain or water where the driving means of the vehicle will slip, higher drive ratios are provided and drive brake steering is provided in a substantial portion of the ratio range. The geared steer is only provided in the higher or highest ratios available. In land operation, $R_1$ and $R_2$ and first forward in the range unit are combined with low in the cross drive unit so that these ratios provide greater torque multiplication than the same ratios during water operation where the high drive of the cross unit is employed. In water operation, the first overall forward ratio is changed to provide the same torque multiplication as the second forward ratio in land operation. Thus only six forward ratio steps are provided. $R_1$ and $R_2$ ratios also have less torque multiplication.

The ratio and steering programs selected by the land (normal) and water (low traction) drive selector control are summarized in the following table with approximate overall ratios and indicating drive brake steer DB, and geared steer GS.

an output drive unit having an input element driven by said transmission unit and a pair of multiple torque ratio output drive establishing means each driven by said input element and having a driven output element selectively operable to provide a plurality of output drive torque ratios selectively operable in combination with selected transmission unit torque ratios to provide a plurality of overall ratio drives; a vehicle brake for retarding each of said output elements; ratio control means having a plurality of control positions operatively connected to said plurality of transmission unit torque ratio establishing means to establish selected ratios in said positions, steer type selector means having a plurality of positions, and steer control means operatively connected to said output drive ratio establishing means and said brakes and controlled by said ratio control means and said steer type selector means to provide in one position of said steer type selector means one group of overall ratios and steering in one subgroup by disestablishing the drive and applying the brake of the output element of the selected output drive establishing means and steering in the remaining overall ratios by disestablishing one drive and establishing another drive of the selected output drive establishing means and operative in another position of said steer type selector means to establish another different group of overall ratios and steering in another different subgroup by disestablishing the drive and applying the brake of the selected output drive establishing means and steering in the remaining overall ratio by disestablishing one drive and establishing another drive of the selected output drive establishing means.

2. The invention defined in claim 1 and said one group of ratios including a ratio having a higher torque multiplication ratio than any ratio in said another different group.

3. The invention defined in claim 2 and said one subgroup including only the very low torque multiplication ratios and said another subgroup including all the low and medium torque multiplication ratios.

4. The invention defined in claim 1 and said one subgroup including only the very low torque multiplication ratios and said another subgroup including all the low and medium torque multiplication ratios.

5. The invention defined in claim 1 and said one group having a series of ratios and said another group having only the higher ratios of said series.

6. The invention defined in claim 5 and said one subgroup being only the lowest ratio of said one group and said remaining overall ratio of said another subgroup being only the highest ratios.

7. The invention defined in claim 1 and said one subgroup being only the lowest ratio of said one group and said remaining overall ratio of said another subgroup being only the highest ratio.

8. The invention defined in claim 1 and said steer control means selectively supplying cooling fluid to the established output drive ratio establishing means.

| Man Sel | Dr. | Clutches applied | | Water operation | | | Land operation | | |
| --- | --- | --- | --- | --- | --- | --- | --- | --- | --- |
| | | Splitter, sec. | Range, sec. | Output, sec. | Overall ratio | Type steer | Output, sec. | Overall ratio | Type steer |
| Rev | $R_1$ | Lo | R | Hi | 5.4:1 | DB | Lo | 7.7:1 | DB |
| | $R_2$ | Hi | R | Hi | 3.9:1 | DB | Lo | 5.6:1 | DB |
| 1 | 1 | Lo | Lo | Hi | 7.5:1 | DB | Lo | 10.9:1 | DB |
| 2-3 | 2 | Lo | Lo | Hi | 7.5:1 | DB | Hi | 7.5:1 | GS |
| | 3 | Hi | Lo | Hi | 5.4:1 | DB | Hi | 5.4:1 | GS |
| 4-5 | 4 | Lo | Int | Hi | 4.0:1 | DB | Hi | 4.0:1 | GS |
| | 5 | Hi | Int | Hi | 2.9:1 | DB | Hi | 2.9:1 | GS |
| 6-7 | 6 | Lo | Hi | Hi | 1.8:1 | GS | Hi | 1.8:1 | GS |
| | 7 | Hi | Hi | Hi | 1.3:1 | GS | Hi | 1.3:1 | GS |
| N | N | Lo or Hi | None | Hi | | DB | Hi | | GS |
| | | | | | | | | | GS |

This invention may be modified within the scope of the appended claims.

What is claimed is:

1. In a transmission assembly, a multiratio transmission unit having a plurality of drive establishing means selectively operable to establish a plurality of torque ratios;

9. The invention defined in claim 1 and said transmission and output drive establishing means being fluid operated, a source of fluid under pressure, said ratio control means selectively controlling the supply of fluid to said transmission drive establishing means, said ratio control means and said steer type selector means providing signal pressures in certain positions, said steer control means including steer valves and relay valves connecting said source to said output drive establishing means and brake, said relay valves being positioned by said signal pressures to change said connections to said output drive establishing means and said brake to provide said groups of drives and subgroups for steering.

10. The invention defined in claim 1 and said output drive ratio establishing means being fluid operated, a source of fluid under pressure, said steer control means including right and left relay valve means each having a straight drive port and a steer drive port and right and left steer valves normally connecting said source to said straight drive port and on selective steer venting one straight drive port and connecting said source at a steer regulated pressure to said steer port, said right and left relay valve means being controlled by said steer type selector means in one position and said ratio control means in one position to connect said drive port to a low ratio and with said ratio control means in all other positions to connect said drive port to a higher ratio to establish said one group of ratios and said relay valve means being controlled by said steer type selector means in another position and said ratio control in all positions to connect said drive port to a higher ratio to establish said another group of ratios.

11. The invention defined in claim 10 and said right and left relay valve means being controlled by said steer type selector means in said one position and said ratio control means in said one position to connect said steer port to said brake for steering of said one subgroup and with said ratio control means in all other positions to connect said steer port to a lower output drive ratio establishing means and said relay valve means being controlled by said steer type selector means in another position and said ratio control means in all but a high ratio to connect said steer port to said brake and in a high ratio to connect said steer port to a lower output drive ratio establishing means.

12. In a transmission assembly; a drive member, a pair of driven members, multiratio transmission means connecting said drive member to each of said driven members having a plurality of ratio establishing means selectively operable to establish said plurality of ratios between said drive member and each of said driven members and including first steering means for selectively making one change of the speed of each of said driven means and second steering means for selectively making another change of the speed of each of said driven means; a steer type selector means having a plurality of positions; ratio control means having a plurality of ratio positions operatively connected to said plurality of drive ratio establishing means and said steer type selector means operative in one position of said steer type selector means to establish one group of equal drive ratio establishing means to each of said driven members and in another position of said steer type selector means to establish a different group of equal drive ratio establishing means to each of said driven members; and steer control means operatively connected to said ratio control means, said plurality of ratio establishing means, said first and second steering means and said steer type selector means operative to selectively actuate said first and second steering means in one program in one position of said steer type selector means and in a different program in another position of said steer type selector means.

13. The invention defined in claim 12 and said first steering means providing a predetermined drive speed of the selected driven member and said second steering means providing a controllable speed change of the speed of the selected driven member.

14. The invention defined in claim 12 and said one group of ratios including more high torque multiplication ratios than said another group.

15. The invention defined in claim 12 and the highest torque multiplication ratio being included in said one group of ratios and excluded from said another group of ratios.

16. The invention defined in claim 12 and said one steering program providing for establishment of said second steering means in low and intermediate ratios and said first steering means in high ratios and said another steering program providing for establishment of said second steering means in low ratios and said first steering means in intermediate and high ratios.

17. The invention defined in claim 12 and said first steering means providing one ratio drive to one driven member and a different ratio drive to the other driven member for geared steering and said second steering means disestablishing the drive to one driven member and retarding rotation of said last mentioned one driven member and maintaining the drive to the other driven member for drive brake steering.

18. The invention defined in claim 17 and said one steering program providing for establishment of said second steering means in low and intermediate ratios and said first steering means in high ratios and said another steering program providing for establishment of said second steering means in low ratios and said first steering means in intermediate and high ratios.

19. The invention defined in claim 17 and the highest torque multiplication ratio being included in said one group of ratios and excluded from said another group of ratios.

20. The invention defined in claim 19 and said one steering program providing for establishment of said second steering means in low and intermediate ratios and said first steering means in high ratios and said another steering program providing for establishment of said second steering means in low ratios and said first steering means in intermediate and high ratios.

References Cited
UNITED STATES PATENTS

| | | | |
|---|---|---|---|
| 2,912,884 | 11/1959 | Christenson et al. | 74—720.5 X |
| 3,174,362 | 3/1965 | Fisher et al. | 74—720.5 |
| 3,239,020 | 3/1966 | Morris et al. | 74—720.5 X |

FRED C. MATTERN, JR., *Primary Examiner.*

ARTHUR T. McKEON, *Assistant Examiner.*